US006632865B2

(12) United States Patent
Kim et al.

(10) Patent No.: US 6,632,865 B2
(45) Date of Patent: Oct. 14, 2003

(54) PRODUCTION PROCESS FOR AQUEOUS COATING COMPOSITION

(75) Inventors: Juhan Kim, Annarbor, MI (US); Jeffrey Makarewicz, Annarbor, MI (US); Jesse Fritcher, Lansing, IL (US)

(73) Assignees: Toyota Technical Center, U.S.A., Inc., Annarbor, MI (US); Nippon Bae Research America, Inc., Lansing, IL (US)

( * ) Notice: Subject to any disclaimer, the term of this patent is extended or adjusted under 35 U.S.C. 154(b) by 0 days.

(21) Appl. No.: 09/943,985

(22) Filed: Sep. 1, 2001

(65) Prior Publication Data

US 2003/0050384 A1 Mar. 13, 2003

(51) Int. Cl.[7] ............................................. C08K 5/3415
(52) U.S. Cl. ...................... 524/104; 524/108; 524/233; 524/315; 524/361; 524/376; 524/378; 524/379; 524/388; 524/475; 524/476; 524/501; 523/201
(58) Field of Search ................................ 524/501, 104, 524/108, 233, 315, 361, 376, 378, 379, 388, 475, 476; 523/201

(56) References Cited

U.S. PATENT DOCUMENTS

| 3,037,881 | A | * | 6/1962 | Tomaino | 428/448 |
|---|---|---|---|---|---|
| 3,300,429 | A | * | 1/1967 | Glavis et al. | 524/516 |
| 3,347,809 | A | * | 10/1967 | McDowell | 524/157 |
| 3,919,153 | A | * | 11/1975 | Fischer | 260/29.4 UA |
| 3,985,698 | A | * | 10/1976 | Matsudaira et al. | 260/29.6 TA |
| 4,782,109 | A | * | 11/1988 | DuLaney et al. | 524/501 |
| 5,011,881 | A | * | 4/1991 | Fujii et al. | 524/457 |
| 5,587,410 | A | * | 12/1996 | Kanaida et al. | 523/410 |
| 5,792,806 | A | * | 8/1998 | Yamamoto et al. | 524/141 |
| 6,025,449 | A | * | 2/2000 | Enomoto et al. | 526/320 |
| 6,048,924 | A | * | 4/2000 | Obayashi et al. | 524/501 |
| 6,268,429 | B1 | * | 7/2001 | Mitsuji et al. | 524/515 |

OTHER PUBLICATIONS 67014320B, 1968, Japan–Derwent Fukui Seiren Kako KK.*

* cited by examiner

*Primary Examiner*—Judy M. Reddick
(74) *Attorney, Agent, or Firm*—Haugen Law Firm PLLP

(57) ABSTRACT

The present invention provides: a production process for an aqueous coating composition including a resin emulsion, which has excellent storage stability, and besides, excellent sagging performance, adhesion and water resistance. The production process for an aqueous coating composition comprises the steps of: beforehand mixing 20 to 50 parts by weight of an aqueous acrylic resin solution with 100 parts by weight of a resin emulsion, wherein the aqueous acrylic resin solution and the resin emulsion are in a state of not including an organic solvent; and adding an organic solvent to a mixed liquid obtained by mixing the resin emulsion and the aqueous acrylic resin solution.

1 Claim, No Drawings

PRODUCTION PROCESS FOR AQUEOUS COATING COMPOSITION

BACKGROUND OF THE INVENTION

A. Technical Field

The present invention relates to a production process for an aqueous coating composition which comprises a resin emulsion. More particularly, the present invention relates to a production process for an aqueous coating composition which gives excellent storage stability, and besides, excellent performance such as improved coatability, adhesion, and water resistance.

B. Background Art

Until now, an organic solvent type coating composition and an aqueous coating composition are used as a coating composition for automotive interior parts. However, organic solvents are being strictly regulated in view of environmental conservation in recent years. The usage of the aqueous coating composition increases due to this situation.

The aqueous coating composition generally comprises a resin emulsion.

In this resin emulsion, the resin component is particulate, and the resin particle itself cannot form coating films. Therefore, a hydrophilic organic solvent having a high boiling point is generally formulated as a promoter for forming coating films.

However, the above organic solvent makes the viscosity of the coating composition increase, and makes it difficult to spray, and besides, makes the qualities of the coating film (for example, adhesion and water resistance) deteriorate.

In order to enable to use a coating composition with a high viscosity, there is a method which involves diluting this coating composition to decrease its viscosity and spraying. However, the method requires a diluting process, and besides, accompanies another problem such that the sagging performance is deteriorated.

SUMMARY OF THE INVENTION

A. Object of the Invention

An object of the present invention is to provide: a production process for an aqueous coating composition including a resin emulsion, which has excellent storage stability, and besides, excellent sagging performance, adhesion and water resistance.

B. Disclosure of the Invention

The present inventors repeatedly studied to solve the above-mentioned problems. As a result, they found that the storage stability is decreased because (1) an organic solvent combined with a coating composition as a promoter for forming coating films is permeated into a resin particle of emulsion and swells the resin particle, and therefore its particle diameter becomes greater, the volume of the resin particle in the coating composition becomes larger, and the viscosity of the coating composition increases in appearance, and (2) the resin particles make partially physical bond each other like a crosslinkage, and consequently the viscosity increases. Then, as a result, they found that the above reasons cause properties of coating films such as sagging performance and adhesion to decrease, depending on circumstances.

The present inventors believed that it is necessary for the resin particle to prevent contact with the organic solvent, and not to swell in the above way, so that the above problems (1) and (2) would not be caused, and further, they variously considered this matter. As a result, they found that an aqueous acrylic resin solution might be added to the resin emulsion in a specific ratio before adding the organic solvent as the film forming promoter. The emulsion resin is covered with the acrylic resin if the aqueous acrylic resin solution is added to the resin emulsion beforehand. Therefore, they supposed that the organic solvent would swell little emulsion resin particle even if the organic solvent is added afterward. The present invention was completed in accordance with these findings.

That is to say, a production process for an aqueous coating composition, according to the present invention, comprises the steps of:

beforehand mixing 20 to 50 parts by weight of an aqueous acrylic resin solution with 100 parts by weight of a resin emulsion, wherein the aqueous acrylic resin solution and the resin emulsion are in a state of not including an organic solvent; and adding an organic solvent to a mixed liquid obtained by mixing the resin emulsion and the aqueous acrylic resin solution.

These and other objects and the advantages of the present invention will be more fully apparent from the following detailed disclosure.

DETAILED DESCRIPTION OF THE INVENTION

The aqueous coating composition, which is obtained by the production process according to the present invention, comprises a resin emulsion, an aqueous acrylic resin solution, and an organic solvent, and further comprises other components if necessary.

[Resin Emulsion]

The resin emulsion as used in the present invention is not especially limited, but examples thereof include an emulsion including a polypropylene chloride resin and/or a water-insoluble acrylic resin as a resin component. Hereinafter, these resins are explained.

(Polypropylene Chloride Resin):

The polypropylene chloride resin is not especially limited, but examples thereof include a polypropylene derivative comprising a polypropylene chloride moiety and a maleic anhydride moiety as bonded to this propylene chloride moiety.

(Water-insoluble Acrylic Resin):

Examples of the water-insoluble acrylic resin include resins obtained by homopolymerizing or copolymerizing acrylic monomers having a hydroxyl group, acrylic monomers having a carboxyl group, or acrylic monomers having an ester group.

The water-insoluble acrylic resin may be modified by the above polypropylene chloride resin.

(Emulsification):

The emulsification of the resins is carried out by conventional methods for producing emulsions as used for paints. When this resin emulsion comprises an organic solvent, the storage stability is decreased, and besides, the sagging performance and the adhesion are decreased.

[Aqueous Acrylic Resin Solution]

In the aqueous acrylic resin solution as used in the present invention, the resin component is a water-soluble acrylic resin, and then, the aqueous acrylic resin solution is obtained by dissolving this resin into water and is not especially limited.

In the present invention, the resin emulsion is combined with the aqueous acrylic resin solution because of increasing the toughness of cured coating films.

When the aqueous acrylic resin solution includes an organic solvent, the storage stability is decreased, and then, the sagging performance and the adhesion are decreased.

The resin component of the aqueous acrylic resin solution is an acrylic resin, and examples thereof include resins obtained by homopolymerizing or copolymerizing acrylic monomers having a hydroxyl group, acrylic monomers having a carboxyl group, or acrylic monomers having an ester group. The resin component has an acid value of 30 to 200 KOH mg/g in terms of solid resin content.

[Production of Aqueous Coating Composition]

In the production process for the aqueous coating composition, it is important that the aqueous acrylic resin composition is mixed with the resin emulsion beforehand, before the organic solvent is added as a promoter for forming coating films.

It is necessary that dispersing solvents of the resin emulsion and the aqueous acrylic resin solution as used in the above way do not substantially include an organic solvent. The claim of the present specification merely describes that the organic solvent is not included. However, that the organic solvent is "not" included means that the organic solvent is "not substantially" included in the above. Therefore, when the content of the organic solvent may be not more than 10 weight %, preferably 5 weight % of a mixed liquid of the resin emulsion and the aqueous acrylic resin solution, the object of the present invention is not damaged. Therefore, the organic solvent may be included in the present case. Examples of the organic solvents which may be included in the above case include solvents as explained in the following way.

The combining ratio of the aqueous acrylic resin solution is 20 to 50 parts by weight, preferably 25 to 45 parts by weight, per 100 parts by weight of the resin emulsion. In case where the combining ratio of the aqueous acrylic resin solution is less than 20 parts by weight, the storage stability of the aqueous coating composition is decreased, and besides, the sagging performance is decreased. On the other hand, in case where the combining ratio of the aqueous acrylic resin solution is more than 50 parts by weight, the water resistance of coating films as obtained from the aqueous coating composition is decreased.

When the aqueous acrylic resin solution is combined with the resin emulsion, it is needless to say that these should be mixed uniformly.

In the production process according to the present invention, after mixing the resin emulsion and the aqueous acrylic resin solution, the organic solvent is added to the resultant mixed liquid as a promoter for forming coating films. When the aqueous coating composition includes the organic solvent, the coating films are easily formed, and the tough coating films are obtained.

Examples of the organic solvent as used in the present invention include: aromatic hydrocarbons such as toluene and xylene; aliphatic hydrocarbons such as hexane, heptane and octane; alicyclic hydrocarbons such as cyclohexane, methylcyclohexane and cyclopentane; esters such as ethyl acetate, n-butyl acetate, isobutyl acetate and amyl acetate; ethers such as n-butyl ether and isobutyl ether; ketones such as acetone, methyl ethyl ketone, methyl isobutyl ketone and cyclohexanone; alcohols such as methanol, ethanol, isopropanol, n-butanol, 2-butanol, n-propylene glycol and isopropylene glycol; cellosolves such as ethylene glycol monomethyl ether, ethylene glycol monobutyl ether and ethylene glycol monoethyl ether acetate; carbitols such as diethylene glycol monoethyl ether; propylene glycol monoalkyl ethers such as propylene glycol monomethyl ether, propylene glycol monoethyl ether and propylene glycol monobutyl ether; and other solvents such as dioxane, N-methylpyrrolidone, dimethylformamide and diacetone alcohol.

When it is necessary to add other components other than the organic solvent in the present invention, the addition is carried out after adding the aqueous acrylic resin solution to the resin emulsion. Incidentally, the addition of the other components may be carried out either before, during or after the addition of the organic solvent.

Examples of the other components, which is added to the aqueous coating composition according to the present invention when the occasion demands, include: emulsions of water-soluble resins, such as polyester resin emulsions, polyurethane resin emulsions, epoxy resin emulsions, or amino resin emulsions; colorants; fillers such as talc; brilliant pigments such as aluminum flake and mica; additives such as surfactants, neutralizers, stabilizers, thickeners, defoamers, surface conditioners, ultraviolet absorbents, and antioxidants; inorganic fillers such as silica; conductive fillers such as conductive carbon, conductive fillers, and metal powders; and auxiliary components such as organic reformers, and plasticizers.

[Objective Materials]

The plastic material, which is an objective material to which the present invention aqueous coating composition is coated, is not especially limited, but examples thereof include: polyolefins such as polypropylene (PP) and polyethylene (PE); acrylonitrile-styrene (AS), acrylonitrile-butadiene-styrene (ABS), poly(phenylene oxide) (PPO), poly(vinyl chloride) (PVC), polyurethane (PU) and polycarbonate (PC). However, the objective material may be other than the plastic materials, for example, a copperplate.

[Coating Method]

The method for coating the present invention aqueous coating composition onto the above objective material may be performed either by air-spray-coating or airless-spray-coating.

The aqueous coating composition is, for example, coated such that the dried-film thickness will be preferably in the range of 10 to 50 $\mu$m, more preferably 15 to 25 $\mu$m. In the case where the dried-film thickness is less than 10 $\mu$m, the thickness might be too thin to obtain a uniform film. On the other hand, in the case where the dried-film thickness is more than 50 $\mu$m, there tends to occur problems of such as coating film cracking.

The coating film may be cured at room temperature, but is preferably cured by heating at 60 to 80° C. to improve the productability or physical properties.

(Effects and Advantages of the Invention):

The present invention can provide the aqueous coating composition, which has excellent storage stability, and besides, excellent sagging performance, adhesion and water resistance.

DETAILED DESCRIPTION OF THE PREFERRED EMBODIMENTS

Hereinafter, the present invention is more specifically illustrated by the following examples of some preferred embodiments in comparison with comparative examples not according to the invention. However, the present invention is not limited to the below-mentioned examples. In addition, hereinafter, the units "part(s)" and "%" are by weight.

Resin emulsion A1 and A2 and a pigment paste as used in the examples and the comparative examples were produced in the following way.

(Production of Resin Emulsion A1):

First, 24.6 parts of polypropylene chloride resin (chlorine content: 22 weight %, maleic anhydride moiety content: 1.5 weight %, and weight average molecular weight: 60,000), 5.6 parts of an emulsifier (Emulgen 920, made by Kao Corporation), and 9.4 parts of xylene were placed into a four-necked flask as equipped with a stirrer. Thereafter, the charged mixture was heated to 95° C. After the charged mixture was dissolved uniformly, 0.45 part of N-methylmorpholine was added thereto with maintaining the temperature at 85° C. At the same time, 59.95 parts of deionized water was dropped. After the completion of dropping, the resultant mixture was stirred for one hour and thus obtaining resin emulsion Al having a nonvolatile solid content of 30%.

(Production of Resin Emulsion A2):

First, 33 parts of deionized water and 1 part of an emulsifier (Dupanol WAQE, made by Witco Corporation) were placed into a four-necked flask as equipped with a stirrer, and the resultant mixture was heated to 70° C. in a stream of nitrogen while being stirred. Separately, an emulsified solution and an initiator solution were prepared, wherein the emulsified solution was obtained beforehand by emulsifying 20 parts of deionized water, 3 parts of the emulsifier, 85.0 parts of methyl methacrylate and 15.0 parts of isobutyl methacrylate, and wherein the initiator solution comprised 4.2 parts of deionized water and 0.2 part of ammonium persulfate. These were added dropwise at 70° C. over a period of 2.5 hours, and further, the reaction is continued for 2.5 hours, and thus obtaining resin emulsion A2 having a nonvolatile solid content of 40%. The transition temperature (° C.) of the acrylic resin moiety in resin emulsion A2 as obtained was 96° C.

(Production of Pigment Paste):

56.4 parts of titanium dioxide, 1.8 parts of carbon black, and 41.8 parts of a water-soluble acrylic resin (nonvolatile solid content: 20%, made by Rohm & Haas Company) were dispersed with a sand mill for 30 minutes, and thus obtaining a pigment paste having a nonvolatile solid content of 67%.

EXAMPLE 1

A blending vessel equipped with a disper stirrer was charged with 25.0 parts of aqueous acrylic resin solution B1 (an aqueous solution of water-soluble acrylic resin, nonvolatile solid content: 20%, made by Rohm & Haas Company). Thereafter, the vessel was charged with 35.7 parts of resin emulsion A1 and 64.3 parts of resin emulsion A2 while being stirred, and the resultant mixture was uniformly blended and dispersed. The following components were added thereto in turn and blended and dispersed. The components were 30.4 parts of N-methylpyrrolidone, 39.6 parts of the pigment paste, 60.0 parts of deionized water, 60.0 parts of talc, 7.3 parts of a resin powder (ART PEARL U-600T, made by Negami Industry Co., Ltd.), 4.1 parts of a polyethylene wax (nonvolatile solid content: 35%, made by Rohm & Haas Company), 1.1 parts of a defoamer (Surfinol 104, nonvolatile solid content: 50%, made by Air Products), and 12.1 parts of a thickener (ASE-60, nonvolatile solid content: 20%, made by Rohm & Haas Company). After dispersing the components, the maturation reaction was carried out for one hour. Then, 16.1 parts of a polycarbodiimde crosslinking agent (Carbodilite E-01, nonvolatile solid content: 40%, made by Nisshinbo Co., Ltd.) and 17.4 parts of deionized water were further added thereto while being stirred, and thus obtaining aqueous coating composition (1) having a nonvolatile solid content of 40%.

[Evaluation for Aqueous Coating Composition]

After washing a polypropylene test piece, aqueous coating composition (1) was air-spray-coated onto the test piece and cured at 70° C. for 5 minutes such that the dried-film thickness would be 20 $\mu$m, and thus obtaining a test piece covered with the coating film.

The properties of the resultant coating film were evaluated in the below evaluation method and the results were shown in Table 1.

(Storage Stability):

The aqueous coating composition was diluted with deionized water to adjust an initial viscosity to 900 cps (25° C.), and the resultant diluted paint was stored at 40° C. for 10 days. Then, the viscosity was measured at 25° C.

O: The viscosity was not more than 1,100 cps at 25° C.

X: The viscosity was more than 1,100 cps at 25° C.

(Sagging Performance):

The diluted paint obtained after the above storage stability test was diluted with deionized water to adjust a viscosity to 900 cps (25° C). Thereafter, the resultant paint was air-spray-coated in an atmosphere of a relative humidity of 80%, and the limiting film thickness for sagging was measured.

O: The limiting film thickness for sagging was not less than 40 $\mu$m.

X: The limiting film thickness for sagging was less than 40 $\mu$m.

(Adhesion):

A hundred pieces of checkerboard squares were made at intervals of 1 mm on the coating film with a cutter knife, and then the peeling test was carried out with an adhesive tape.

O: All the hundred pieces of checkerboard squares remained on the test piece.

X: One or more pieces of checkerboard squares were peeled off from the test piece.

(Water Resistance):

A polyethylene cylinder was placed on the coating film, and 5 ml of deionized water was added dropwise thereto. The upper opening portion was covered with a glass plate, and the test piece was left in a thermoregulator of 55° C. for 4 hours. Then, the cylinder was taken off, and the coating film was washed with water and air-dried. The situation change of the coating film was observed.

O: The portion in contact with the deionized water was not different from the portion not in contact with it.

X: The portion in contact with the deionized water discolored, and decreased gloss. Extraordinariness such as blistering was observed.

EXAMPLES 2 and 3

Aqueous coating compositions were produced and evaluated in the same way as of Example 1 respectively, except that the content of the component each was changed according to Table 1. The results were shown in Table 1 respectively.

COMPARATIVE EXAMPLE 1

A blending vessel equipped with a disper stirrer was charged with 35.7 parts of resin emulsion A1, 64.3 parts of resin emulsion A2, and 30.4 parts of N-methylpyrrolidone, and the resultant mixture was uniformly dispersed. The following components were added thereto in turn and blended and dispersed. The components were 39.6 parts of the pigment paste, 35.0 parts of aqueous acrylic resin solution B1 (an aqueous solution of water-soluble acrylic resin, nonvolatile solid content: 20%, made by Rohm & Haas Company), 60.0 parts of deionized water, 60.0 parts of talc, 7,3 parts of a resin powder (ART PEARL U-600T, made by Negami Industry Co., Ltd.), 4.1 parts of a polyethylene wax (nonvolatile solid content: 35%, made by Rohm & Haas Company), 1.1 parts of a defoamer (Surfinol 104, nonvolatile solid content: 50%, made by Air Products), and 12.1 parts of a thickener (ASE-60, nonvolatile solid content: 20%, made by Rohm & Haas Company). After dispersing the components, the maturation reaction was carried out for one hour. Then, 16.1 parts of a polycarbodiimde crosslinking agent (Carbodilite E-01, nonvolatile solid content: 40%, made by Nisshinbo Co., Ltd.) and 17.4 parts of deionized water were further added thereto while being stirred, and thus obtaining a comparative aqueous coating composition having a nonvolatile solid content of 40%. The comparative aqueous coating composition was evaluated in the same way as of Example 1. The results were shown in Table 1.

COMPARATIVE EXAMPLES 2 to 4

Comparative aqueous coating compositions were produced and evaluated in the same way as of Example 1 except that the kind and/or the content of the component each was changed according to Table 1. The results were shown in Table 1.

COMPARATIVE EXAMPLE 5

A comparative aqueous coating compositions was produced and evaluated in the same way as of Example 1 except for not adding aqueous acrylic resin solution B1. The results were shown in Table 1.

TABLE 1

|  | Example 1 | Example 2 | Example 3 | Comparative Example 1 | Comparative Example 2 | Comparative Example 3 | Comparative Example 4 | Comparative Example 5 |
|---|---|---|---|---|---|---|---|---|
| Before hand mixing | Yes | Yes | Yes | No | Yes | Yes | Yes | — |
| Resin emulsion A1 | 35.7 | 35.7 | 35.7 | 35.7 | 35.7 | 35.7 | 35.7 | 35.7 |
| Resin emulsion A2 | 64.3 | 64.3 | 64.3 | 64.3 | 64.3 | 64.3 | 64.3 | 64.3 |
| Aqueous acrylic resin solution B1 | 25.0 | 35.0 | 44.6 | 35.0 | 15.0 | 55.0 | — | — |
| Aqueous acrylic resin solution B2 | — | — | — | — | — | — | 35.0 | — |
| Total of resin emulsion and aqueous acrylic resin solution | 125.0 | 135.0 | 144.6 | 135.0 | 115.0 | 155.0 | 135.0 | 100 |
| N-Methylpyrrolidone | 30.4 | 30.4 | 30.4 | 30.4 | 30.4 | 30.4 | 30.4 | 30.4 |
| Pigment paste | 39.6 | 39.6 | 39.6 | 39.6 | 39.6 | 39.6 | 39.6 | 39.6 |
| Deionized water | 60.0 | 60.0 | 60.0 | 60.0 | 60.0 | 60.0 | 60.0 | 60.0 |
| Talc | 60.0 | 60.0 | 60.0 | 60.0 | 60.0 | 60.0 | 60.0 | 60.0 |
| Resin powder | 7.3 | 7.3 | 7.3 | 7.3 | 7.3 | 7.3 | 7.3 | 7.3 |
| Polyethylene wax | 4.1 | 4.1 | 4.1 | 4.1 | 4.1 | 4.1 | 4.1 | 4.1 |
| Defoamer | 1.1 | 1.1 | 1.1 | 1.1 | 1.1 | 1.1 | 1.1 | 1.1 |
| Thickener | 12.1 | 12.1 | 12.1 | 12.1 | 12.1 | 12.1 | 12.1 | 12.1 |
| Polycarbodiimde | 16.1 | 16.1 | 16.1 | 16.1 | 16.1 | 16.1 | 16.1 | 16.1 |
| Deionized water | 17.4 | 17.4 | 17.4 | 17.4 | 17.4 | 17.4 | 17.4 | 17.4 |
| Total | 373.1 | 383.1 | 392.7 | 383.1 | 363.1 | 403.1 | 383.1 | 348.1 |
| Storage stability | ○ | ○ | ○ | X | X | ○ | X | X |
| Sagging performance | ○ | ○ | ○ | X | X | ○ | X | X |
| Adhesion | ○ | ○ | ○ | X | ○ | ○ | X | X |
| Water resistance | ○ | ○ | ○ | ○ | ○ | X | ○ | X |

(Footnote)
All the units of numeral values are parts by weight.
Aqueous acrylic resin solution B1: resin/water = 20/80 (weight ratio); and
Aqueous acrylic resin solution B2: resin/water/ethylene glycol monobutyl ether = 20/40/40 (weight ratio)

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A production process for an aqueous coating composition, which comprises the steps of:
    a) mixing 20 to 50 parts by weight of an aqueous acrylic resin solution with 100 parts by weight of a resin emulsion, wherein the resin emulsion comprises i) a polypropylene chloride resin as a resin component or ii) a polypropylene chloride resin and a water-insoluble acrylic resin as a resin component, wherein the aqueous acrylic resin solution and the resin emulsion are in a state of not including an organic solvent; and then
    b) adding an organic solvent to a mixed liquid obtained by mixing the resin emulsion and the aqueous acrylic resin solution, wherein the organic solvent is selected from the group consisting of aromatic hydrocarbons, aliphatic hydrocarbons, alicyclic hydrocarbons, ethyl acetate, n-butyl acetate, isobutyl acetate, amyl acetate, ethers, ketones, methanol, ethanol, isopropanol, n-butanol, 2-butanol, n-propylene glycol, isopropylene glycol, cellosolves, carbitols, propylene glycol monoalkylu ethers, dioxane, N-methylpyrrolidone, dimethylformamide, and diacetone alcohol.

* * * * *